United States Patent [19]

Mizuta

[11] Patent Number: 4,808,894

[45] Date of Patent: Feb. 28, 1989

[54] POWER WINDOW DEVICE

[75] Inventor: Ken Mizuta, Miyagi, Japan

[73] Assignee: Alps Electric Co., Ltd., Japan

[21] Appl. No.: 120,712

[22] Filed: Nov. 13, 1987

Related U.S. Application Data

[63] Continuation-in-part of Ser. No. 902,923, Aug. 29, 1986, abandoned.

[30] Foreign Application Priority Data

Sep. 4, 1985 [JP] Japan .......................... 60-135811[U]

[51] Int. Cl.⁴ ............................................ B60R 25/00

[52] U.S. Cl. .................................. 318/266; 318/265; 318/445; 318/452; 318/484; 307/10 R

[58] Field of Search ............... 318/264, 265, 266, 282, 318/283, 284, 286, 434, 461, 466, 467, 468, 469, 470, 445, 446, 452, 484; 307/10 R; 49/26, 28

[56] References Cited

U.S. PATENT DOCUMENTS

| | | | |
|---|---|---|---|
| 4,427,929 | 1/1984 | Andrei-Alexandru et al. | 318/282 |
| 4,450,390 | 5/1984 | Andrei-Alexandru et al. | 318/286 X |
| 4,468,596 | 8/1984 | Kinzl et al. | 318/287 |
| 4,516,034 | 5/1985 | Bier | 307/10 R |
| 4,628,234 | 12/1986 | Mizuta et al. | 318/264 X |
| 4,728,870 | 3/1988 | Hirano et al. | 318/484 X |
| 4,733,100 | 3/1988 | Nusairat et al. | 307/10 R X |

FOREIGN PATENT DOCUMENTS

| | | | |
|---|---|---|---|
| 3029960 | 3/1981 | Fed. Rep. of Germany | 49/28 |

*Primary Examiner*—Bentsu Ro
*Attorney, Agent, or Firm*—Guy W. Shoup; Paul J. Winters

[57] ABSTRACT

A power window device is adapted to drive a motor which automatically closes a windowpane of a car in response to door locking of the car, and cut the drive power for the motor after a predetermined time.

3 Claims, 3 Drawing Sheets

POWER WINDOW DEVICE

This is a continuation application from application Ser. No. 902,923 filed Aug. 29, 1986, now abandoned.

FIELD OF THE INVENTION

This invention relates to a power window device for automatically moving up and down a windowpane of a car, for example.

BACKGROUND OF THE INVENTION

In conventional cars, a windowpane is moved up or down by manually rotating a handle in a desired direction. In more automated cars, however, various arrangements are used to automatically move a windowpane up and down. One of these arrangements is disclosed in Japanese patent publication No. 42130/1979 entitled "automatic windowpane driving device".

In this arrangement, when an on- or off-signal is entered by one-touch manual operation of an upward drive contact, a relay coil is energized. The energization is maintained for a time to continuously drive a motor to gradually elevate a windowpane. When the windowpane reaches its upper limit or compresses a solid foreign matter or obstacle between the windowpane and an opposed margin of the window frame, the revolution of the motor changes. This change is detected by a voltage detector circuit, and a detection signal therefrom interrupts energization of the relay coil to stop the motor.

It sometimes happens that a driver inadvertently locks the door of his car, not closing its windows. If the driver leaves the non-closed car, things left in the car will be readily stolen.

OBJECT OF THE INVENTION

It is therefore an object of the present invention to provide a power window device which automatically closes windows in response to door locking of a car.

SUMMARY OF THE INVENTION

According to the present invention, there is provided a power window device comprising:

a drive motor activated to drive a windowpane of a car up and down;

a selective switch operating arrangement for selection of up or down movement of said windowpane;

a switch brought to its on position when a door lock key of the car is latched;

a drive power supply means responsive to closure of said switch to supply said motor with an electric power, and a means responsive to said closure of said switch to instruct upward drive of said windowpane; and a release means responsive to said closure of said switch to terminate power supply of said drive power supply means a predetermined time later than the closure of the switch.

BRIEF DESCRIPTION OF THE DRAWINGS

FIG. 4 is a circuit diagram of one embodiment of a potential detecting circuit for the invention.

DETAILED DESCRIPTION

Figure 1:
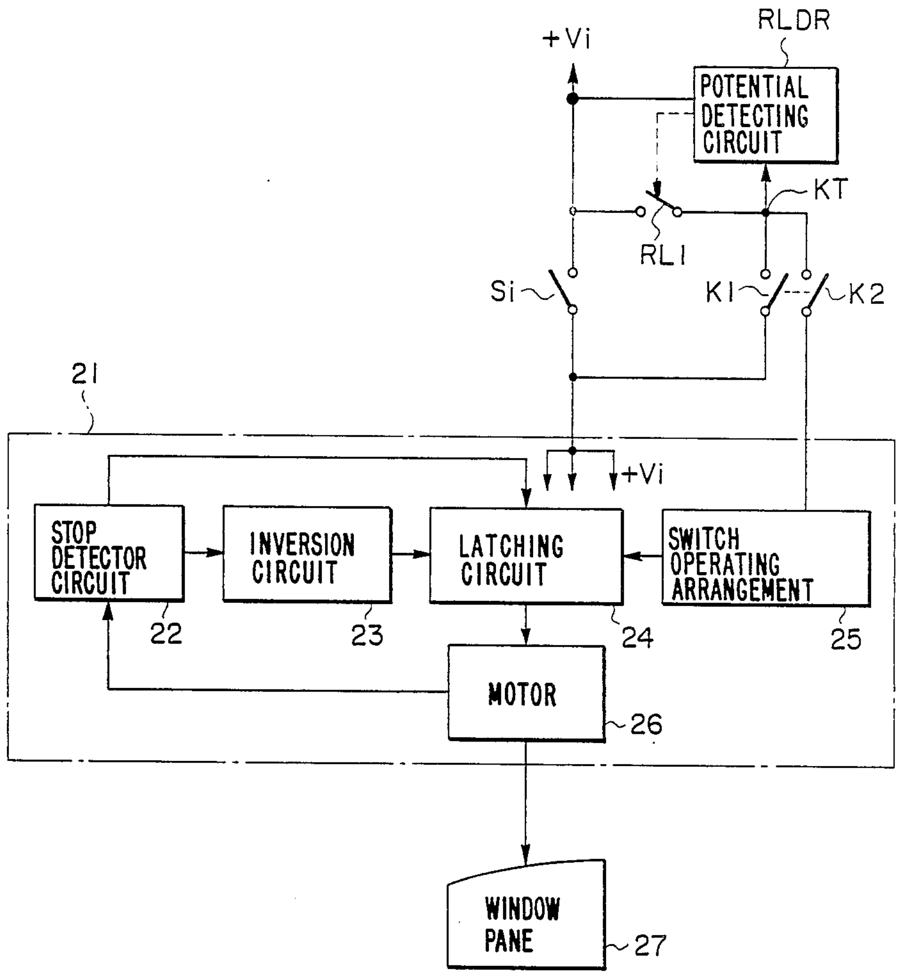
FIG. 1 is a block diagram of a power window device embodying the invention.

The invention is hereinbelow described in detail, referring to a preferred embodiment illustrated in the drawings.

FIG. 1 shows an embodiment of the invention in which a power window device generally designated at 21 comprises a detector circuit 22, inversion circuit 23, latching circuit 24, switch operating arrangement 25 and motor 26 which are activated by an operation voltage $V_i$ applied thereto when the ignition switch $S_i$ of a car is thrown in.

If a human hand or neck is sandwiched between a windowpane 27 and the upper margin of a window frame (not shown) of the car before the windowpane 27 reaches its upper limit during its upward movement, the detection circuit 22 reliably detects it, and produces a detection signal.

The inversion circuit 23 receives the detection signal from the detection circuit 22, and responsively releases latching condition of the latching circuit 24 to invert the rotation of the motor 26 to the opposite direction for downward movement of the windowpane 27. When the windowpane 27 reaches its lower limit, the motor 26 stops.

Figure 2:
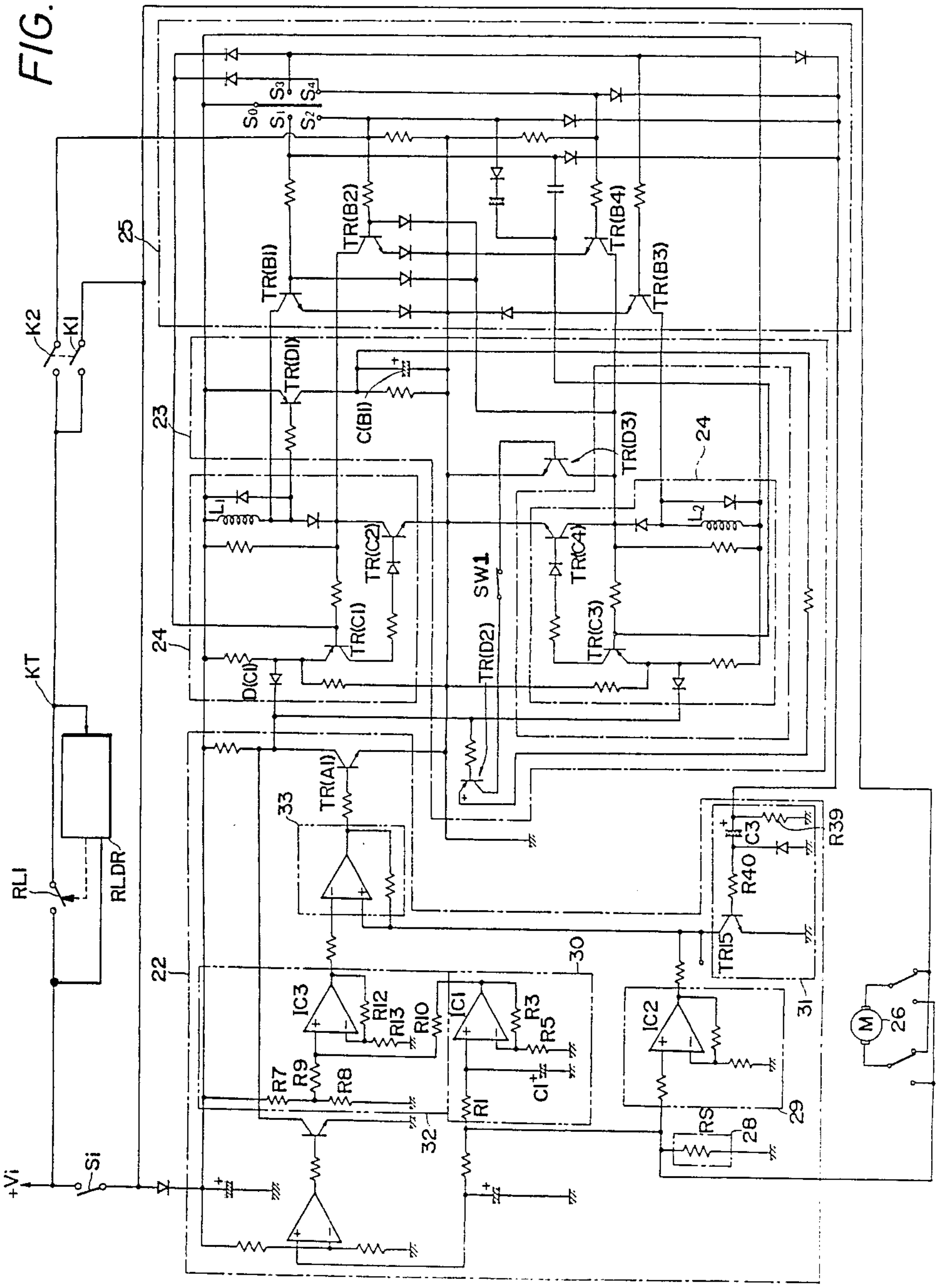
FIG. 2 shows a detailed circuit arrangement of the embodiment of FIG. 1.

Discrimination of whether the windowpane has reached its upper limit or not is effected by a position detecting switch SW1 (FIG. 2). More specifically, when the switch SW1 is turned on, and a detection signal is entered from the detection circuit 22, the motor changes its rotating direction in the AND mode. On the other hand, when the switch SW1 is turned off, and a detection signal is entered from the detection circuit 22, the motor 26 stops its rotation in the AND mode. Therefore, the position detecting switch SW1 is preferably mounted at a position near the upper window frame along the movement path of the windowpane 27 or its support member.

The latching circuit 24 has the function of holding the energized condition of the motor 26 when an input from either one of the switch S2 for upward movement and S4 for downward movement is set to a high potential. However, the latching circuit 24 immediately releases the holding mode when the detection circuit 22 is activated due to a blockage of the motor 26.

The power window device 21 is supplied with an operation voltage $+V_i$ from a car battery (not shown) via the ignition switch $S_i$. A relay switch RL1 and a key switch K1 connected in series are provided in parallel relationship with the ignition switch $S_i$. Their common junction KT is connected to the switch operating arrangement 25 of the power window device 21 via another key switch K2. At the common junction KT is provided a potential detecting circuit RLDR including a detector for energizing the relay coil to close the relay switch RL1 when the key switches are closed, and a timer which forcibly opens the relay switch RL1 after a predetermined time.

Both key switches K1 and K2 are closed together only when the door lock key of the car is latched.

FIG. 2 is a detailed circuit arrangement of the device of FIG. 1.

The detection circuit 22 comprises a motor waveform sensor 28, real time amplifier 29, delay amplifier 30, starting voltage cancellor 31, non-invertible adder/amplifier 32 and comparator 33.

The motor waveform sensor 28 includes a resistor RS converting the motor current to a voltage, and produces an output voltage having a waveform shown in FIG. 3 at (A) which defines the voltage at the starting of motor activation at (a), during normal operation at (b) and on a blockage by an obstacle at (c).

The real time amplifier 29 amplifies the voltage from the resistor RS to a (1+R4/R6) multiplied value, and produces an output having a waveform shown in FIG. 3 at (B).

The delay amplifier 30 amplifies the voltage from the resistor RS to a (1+R3/R5) multiplied value with a delay time T1 determined by a capacitor C1 and a resistor R1, and produces an output having a waveform shown in FIG. 3 at (C).

Figures 3A, 3B, 3C, 3D:
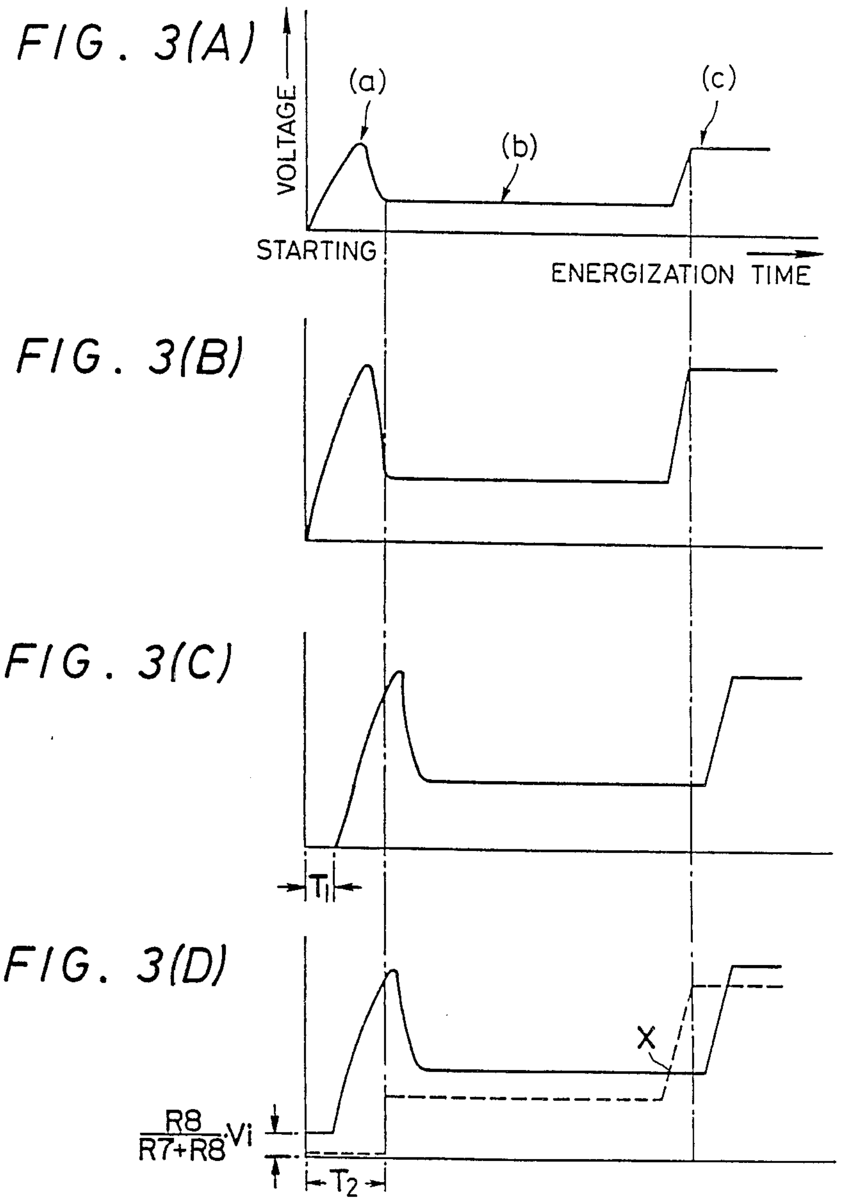
FIG. 3 shows at (A) through (D) voltage waveforms at different points of a detection circuit during energization of a motor.

The starting voltage cancellor 31 forcibly turns on a transistor TR15 for a time T2 fixed by a capacitor C3 and a resistor R40 at the moment where the switch SW1 is turned on, so as to cancel the voltage at the starting of motor activation, and produces an output having a dotted line waveform shown in FIG. 3(D) (dotted line), which has its output from the starting time to time T2 cancelled. The non-invertible adder/amplifier 32 is a circuit for outputting a value, equal to the voltage value determined by $(R8/(R7+R8)\times Vi$ added to the output voltage value of the delay amplifier 30, as shown in the output waveform (solid line) in FIG. 3(D).

The comparator 33 sequentially compares the output voltage of the starting voltage cancellor 31 with the output voltage of the non-invertible adder/amplifier 32, and determines whether the motor 26 is locked by a blockage caused by an obstacle or not.

More specifically, the non-invertible adder/amplifier 32 preliminarily adds a voltage $\{R8/(R7+R8)\}\cdot V_i$ to the T1 delayed voltage of the motor 26 from the delay amplifier 30, and the sum voltage as indicated by a solid line waveform in FIG. 3(D), is entered in the inversion input terminal of the comparator 33. On the other hand, the non-inversion input terminal of the comparator 33 is supplied with the voltage lacking part of the original motor voltage removed by the transistor TR15 for the time T2 from the motor starting. In FIG. 3 at (D), the solid line shows the voltage of the inversion input terminal of the comparator, whereas the dotted line shows the voltage of the non-inversion input terminal of same, and they are shown in an overlapping fashion for a convenience.

As a result, the comparator 33 compares the present motor voltage with the T1 preceding motor voltage (having an addition of $\{R8/(R7+R8)\}\cdot V_i$).

If the present motor voltage is lower than the preceding motor voltage, the output of the comparator 33 is maintained at the "low" level. However, if the present motor voltage becomes higher than the preceding motor voltage, the output of the comparator 33 is changed from the "low" level to the "high" level, and the comparator 33 thereby determines that the motor 26 has been locked.

Up and down movement of the windowpane is hereinbelow described. Referring to FIG. 2, $S_0$ designates a common contact of a switch connected to the (+) terminal of the car battery via the ignition switch $S_i$, $S_1$ and $S_3$ denote a manual upward drive contact and a manual downward drive contact, respectively, and $S_2$ and $S_4$ label an automatic upward drive contact and an automatic downward drive contact, respectively.

When the common contact $S_0$ is connected to the manual upward drive contact $S_1$, the transistor TR (B1) is turned on, the current flows in the relay coil L1, the motor 26 is rotated, and the windowpane 27 is driven upward. Concurrently, the transistor TR (D1) is turned on, and the emitter of the transistor TR (D2) is supplied with a (+) potential.

If a solid foreign matter such as human arm or neck is sandwiched between the upper margin of the windowpane 27 and the window frame during upward movement of the windowpane 27, the detection circuit 22 detects it and produces a detection signal. Since the transistor (A1) is turned on responsively, the base voltage of the transistor TR (D2) drops, and the transistor TR (D3) is turned on by the (+) potential which passed through the position detecting switch SW1 concurrently with conduction of the transistor TR (D2). Therefore, the base potential of the transistor TR (B1) decreases to the ground potential to turn off the transistor TR (B1), and the relay coil L1 is deenergized to stop the rotation of the motor 26 and the upward movement of the windowpane 27.

Concurrently with the stop of the motor, the current flows in the relay coil L2 of the relay which is adapted to rotate the motor 26 in the downward drive direction. Accordingly, the motor 26 rotates in the opposite direction and immediately commences its downward drive of the windowpane 27. Therefore, if an obstacle is sandwiched between the windowpane 27 and the window frame while connection between the contacts $S_0$ and $S_1$ is maintained, the detection circuit 22 detects it, and the motor 26 is immediately rotated in the opposite direction in response to the detection signal from the detection circuit 22 and drives the windowpane 27 downward.

When the common contact $S_0$ is connected to the automatic upward drive contact $S_2$, the transistor TR (B2) is turned on so that the current flows in the relay coil L1 to commence rotation of the motor 26. Concurrently, the transistors TR (C1) and TR (C2) are turned on to latch the circuit to maintain energization of the relay coil L1. Therefore, the windowpane 27 continues its upward movement until it reaches the upper margin of the window frame. If an obstacle is sandwiched between the windowpane and the window frame during upward movement of the windowpane, the detection circuit 22 detects it and turns off the transistor TR (C1) to interrupt current flow to the relay coil L1 and stop the motor 26. The motor rotation is rotated in the reverse direction immediately after the motor stops in the same fashion as described above.

The detection switch SW1 is located at a position where the windowpane 27 contacts it when the windowpane 27 significantly approaches the upper margin of the window frame where a small gap therebetween is unlikely to sandwich human fingers or other solid matter. The position detecting switch SW1 is of a normally closed contact type, so that it is changed from its on position to off position slightly before the windowpane 27 engages the upper window frame. Since the transistor TR (D2) is in non-conductive state accordingly, no current is supplied to the relay coil L2 of the downward drive relay, and the windowpane 27 stops in engagement with the upper margin of the window frame.

If a foreign matter is sandwiched between the windowpane 27 and the window frame while contact of the contacts $S_0$ and $S_2$ is maintained, since the position detecting switch SW1 takes its on position, the transistor TR (B2) is turned off, with the base potential thereof degraded to the ground potential by the detection signal from the detection circuit 22, so that the upward drive relay coil L1 is deenergized whereas the downward drive relay coil L2 is energized to invert the motor rotation and drive the windowpane 27 downward. Therefore, there is no danger regardless of maintained connection between the contacts $S_0$ and $S_2$.

When the common contact $S_0$ is connected to the manual downward drive contact $S_3$ or automatic downward drive contact $S_4$, the motor 26 is rotated in the reverse direction to drive the windowpane by operation of the transistor TR (B3), or by operation of the transistor TR (B4), transistor TR (C3) and transistor TR (C4). When the windowpane reaches its lower limit, the transistor TR (C3) is turned off in response to a detection signal from the detection circuit 22 and terminates the downward movement of the windowpane 27.

In the above-described embodiment, the detection means for detecting that a solid matter is sandwiched between the windowpane and the window frame during upward movement of the windowpane includes the sensor means for measuring a characteristic of the windowpane driving motor and the comparator means for comparing the present and preceding values of the motor characteristic to produce a blockage detection signal when the deviation clarified by the comparison exceeds a predetermined value.

This sequential monitoring of the motor load by comparison of the present motor characteristic and a preceding motor characteristic ensures a reliable detecting operation of the detection means, with no substantial affection by external condition such as deformation of the window frame, ambient temperature, voltage drop of the discharge of a car battery, etc. Therefore, the detection means can immediately detect a blockage of the motor and windowpane caused by a solid matter.

The aforegoing description is directed to the entire operation of the power window device 21 according to the invention while the ignition switch $S_i$ is activated.

The next description is directed to a case where a driver leaves his car having the power window device 21.

When the engine of the car is turned off, the ignition switch is turned off (switch opened), so that the operating voltage Vi is cut off and the power window device 21 is not operated. If the driver locks a door lock with a key, both key switches K1 and K2 are closed. The closing of the key switches is detected by the RLDR (potential detecting) circuit, which then energizes a relay coil to close the relay switch RL1.

Referring to FIG. 4, an example of an RLDR circuit for the power window device 21 is shown. When the key switches K1 and K2 are open, the comparator circuit formed by IC6 has one (−) terminal kept at a high potential through the source voltage Vi supplied through resistor R80 and charged on capacitor C1. The other (+) terminal of IC6 is kept at a high potential through resistors R82 and R81. The potential at the one (−) terminal is the same as the common junction point KT. When the key switches K1 and K2 are closed, the potential at KT is lowered by connection through switch K2 to lead line 40, and discharge of capacitor C1, to ground through switch operating arrangement 25.

When the change in potential at KT is detected by the comparator IC6, it outputs a high level output through a timer circuit to the base of transistor TR(E), which renders it conducting to energize the relay coil RL over a specified period of time. The relay coil RL closes the relay switch RL1 to apply the voltage Vi through key switch K1 and at the same time through K2 to switch contact S2 (see FIG. 2), for automatic upward movement, and to the base of transistor TR(B2). The transistor TR(B2) is rendered conducting to cause the windowpane to be closed.

If the power window device 21 is left in the above condition, the battery power would be needlessly consumed over a long period of time. Therefore, the RLDR circuit has a timer function to prevent this drawback. That is, the timer circuit formed by resistor R53 and capacitor C8 becomes charged after the specified period of time, and the output thereof is eliminated, therby shutting off relay coil RL and opening relay switch RL1. This period of time is selected to be slightly longer (e.g. 30 seconds) than that required for complete closing of the windowpane 27.

Although the door lock key closes key switches K1 and K2 in the above-described embodiment, the door lock key may instead be used to enable a one-shot multivibrator, for example, to latch an output of the detector circuit for a specified period of time. The above system has been described using discrete component parts, but it can readily be performed by using logic IC components, electronic relays, a microcomputer, or the like.

As described, the invention device automatically closes the car window when a driver failed to close the window before he locks the door.Therefore, a driver can feel at ease when he leaves his car.

The embodiments of the invention in which an exclusive property or privilege as claimed are defined as follows:

1. A power window device comprising:
- a drive motor for driving a windowpane of a car in an opening direction and a closing direction;
- a switch operating arrangement for selectively operating said drive motor to open or close the windowpane;
- a separate switch which is normally open having one terminal connected to a power source in said car;
- switch closing means for detecting when a door lock key is used to lock a door of said car and for closing said separate switch in response thereto;
- drive means responsive to the closing of said separate switch for operating said drive motor to drive the windowpane in the closing direction; and
- means cooperating with said switch closing means for reopening said separate switch after a predetermined period of time sufficient to obtain closing of the windowpane.

2. A power window device of claim 1 further comprising a detection means for changing the movement direction of said windowpane from closing direction to opening direction when it detects that a solid matter or obstacle is sandwiched between the windowpane and an opposed margin of the window frame during closing movement of the windowpane.

3. A power window device of claim 2 wherein said detection means comprises: a sensor means measuring a characteristic of said drive motor; a comparator means comparing the present and preceding values of the motor characteristic supplied from said sensor means to obtain a deviation value therefrom; and a detection signal generating means generating a detection signal when said deviation value exceeds a predetermined level.

* * * * *

UNITED STATES PATENT AND TRADEMARK OFFICE

CERTIFICATE OF CORRECTION

PATENT NO. : 4,808,894

DATED : February 28, 1989

INVENTOR(S) : Ken Mizuta

It is certified that error appears in the above-identified patent and that said Letters Patent is hereby corrected as shown below:

In the Title:

Title amended to read --POWER WINDOW DEVICE WITH CIRCUIT FOR AUTOMATIC WINDOW CLOSING--.

Signed and Sealed this

Twenty-ninth Day of August, 1989

*Attest:*

DONALD J. QUIGG

*Attesting Officer*

*Commissioner of Patents and Trademarks*